July 3, 1928.
J. M. HOWE
BEARING MECHANISM
Filed Sept. 6, 1924
1,675,932
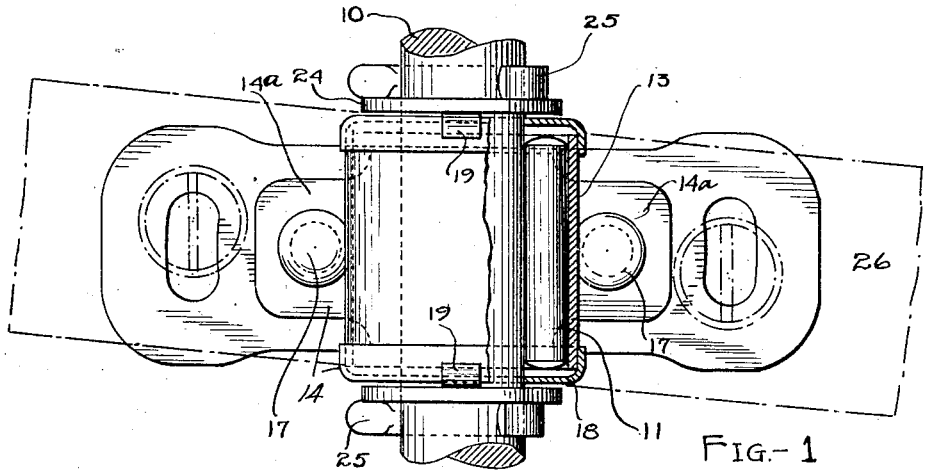
FIG.-1
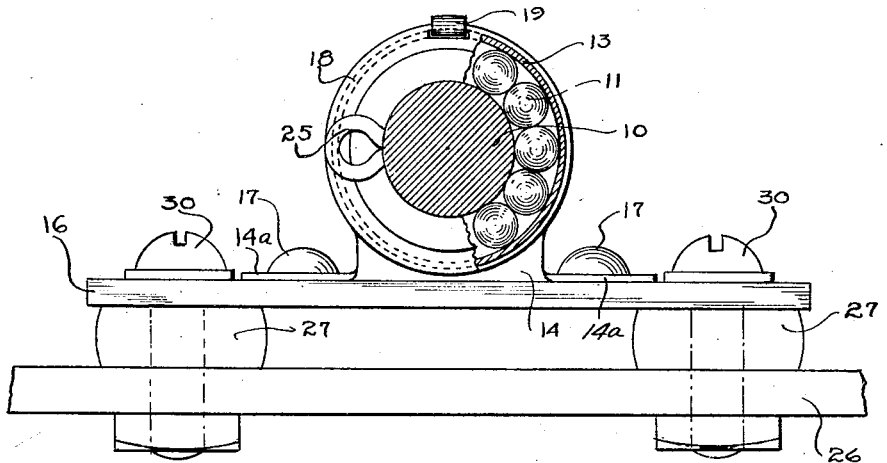
FIG.-2
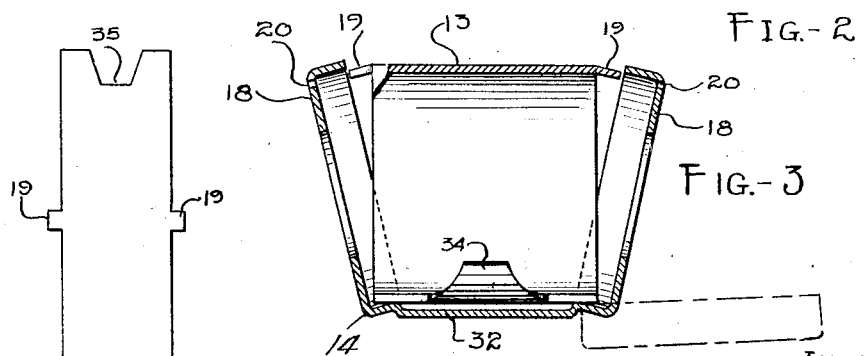
FIG.-3
FIG.-4
INVENTOR.
James M. Howe
By Bates, Macklin, Goldrick & Teare
ATTORNEYS Patented July 3, 1928.

1,675,932

UNITED STATES PATENT OFFICE.

JAMES M. HOWE, OF CLEVELAND HEIGHTS, OHIO, ASSIGNOR TO THE MURRAY MANUFACTURING COMPANY, OF CLEVELAND, OHIO, A CORPORATION OF MICHIGAN.

BEARING MECHANISM.

Application filed September 6, 1924. Serial No. 736,224.

This invention is concerned with bearings and more particularly to bearings adapted to support a rotatable member such as a shaft or axle and has for its general object the provision of a bearing mechanism adapted to support a rotatable member while permitting flexing movement between the bearing mechanism and the supporting medium whereby the rotatable member may move relative to the supporting member without causing a binding action on the journal of the bearing.

More specifically my invention is concerned with the provision of a novel and economical bearing construction for a toy vehicle, particularly for spring mounted toy vehicles having a floating rear axle.

Other objects of my invention will hereinafter be set forth in the following description referring to the accompanying drawings illustrating a form thereof. The essential characteristics are summarized in the claims.

Fig. 1 is a plan view of my bearing construction shown in association with the axle and spring of a vehicle; Fig. 2 is a side elevation of the bearing mechanism, while Fig. 3 is a cross-sectional view taken substantially along the lines 3—3 of Fig. 1; and Fig. 4 is a plan development of a blank which may be formed into a journal sleeve.

My invention contemplates an economical bearing construction which preferably may be formed of metal stampings. As shown in the drawings, a rotatable member 10 bears on a plurality of roller members 11. These members bear directly upon the circumferential surface of the rotatable member 10. The cage for the roller members 11 comprises two stamped members, a cylindrical bearing member or sleeve 13 rolled up from a flat sheet, and a bracket member 14 which is mounted upon a supporting plate 16 secured thereto by any suitable means such as rivets 17. The bracket has a base comprising oppositely extending flanges 14ª to rest on the plate 16.

The bracket member 14 has cup-shaped portions 18 formed integrally therewith, as shown in Fig. 3 to extend over the ends of the cylindrical sleeve member 13, and thereby serve as roller retainers. The sleeve member is preferably provided with end lugs 19 which may extend through suitable openings 20 formed in the walls of the cup-shaped portions 18 of the bracket whereby these lugs may be bent upwardly and over the top thereof as shown in Figs. 1 and 2 to secure the cylindrical member 13 and bracket member 14 together.

Both the bracket and sleeve may be formed from sheet metal by stamping operations. The bracket may have the end or cup-shaped portions thereof first formed from the plane of the metal sheet as shown by the dot and dash lines in Fig. 3 with the connecting portion 32 forming the base of the cage. The sleeve 13 may be formed in blank as shown in Fig. 4 with a lug 34 at one end which is adapted to fit into a notch shown at 35 formed in the opposite end. The end edges of the blank thus match each other when the blank is curled into a cylinder form.

Mounted upon the rotatable member 10 adjacent the cupped portions of the bracket are thrust members 24 in the form of washers which may be prevented from displacement in any suitable manner preferably by pin members 25 extending through openings formed in the rotatable member 10.

To permit the rotatable member 10 to have a relative movement, other than a rotatable movement, to the bearing supporting medium, in this instance a vehicle spring member 26, I provide a resilient means between the plate 16 of the bearing mechanism and the spring member 26. This resilient means may be preferably in the form of rubber washers 27 through which extend bolts 30 which secure the bearing mechanism to the vehicle spring member 26.

It is to be understood that the bearing construction which I herein describe is adaptable for purposes other than the specific intent set forth in the second object of my specification.

It will be seen from the foregoing description that the roller cage may comprise two members, one a tubular bearing retaining sleeve, the other a bracket for supporting and closing the ends of the sleeve after the rollers have been inserted.

Having thus described my invention, I claim:

1. In a bearing of the character described the combination of the rotatable member to be borne, a cylindrical sleeve, a plurality of roller members disposed between the sleeve and the rotatable member, a bracket member supporting the sleeve, formed to comprise a base having vertically extending cup shaped portions adapted to close both ends of the sleeve, there being means carried by the sleeve and interengaging with the cup shaped portions to hold these portions rigid with the sleeve.

2. In combination, a bearing adapted to support a rotatable member, a plurality of roller members contacting directly with the rotatable member, a sleeve forming a cage for the roller and a base member supporting the sleeve and having formed thereon end closure portions for the sleeve to retain the rollers therein, the ends of the sleeve being formed to interengage with the closure portions of the base member in such manner that the sleeve holds the closure portions in place.

3. A two piece roller bearing cage comprising a cylindrical bearing sleeve, and a sleeve supporting member adapted to close the ends of the sleeve member, there being means on the sleeve engaging the supporting member at each closing portion thereof for retaining the cage elements together.

4. A roller bearing cage comprising a sleeve adapted to be made from a single piece sheet metal strip, said strip having lugs thereon and a bracket adapted to be made from sheet metal and having two flanges and a pair of cup-shaped members extending transversely to the flanges and arranged to extend in telescoping engagement with the sleeve, said cup-shaped portions having openings to receive the lugs.

In testimony whereof, I hereunto affix my signature.

JAMES M. HOWE.